March 18, 1969 R. S. KNAPP 3,433,930
BROILER WITH REMOVABLE HEATING CARTRIDGE
Filed May 2, 1966 Sheet 2 of 2

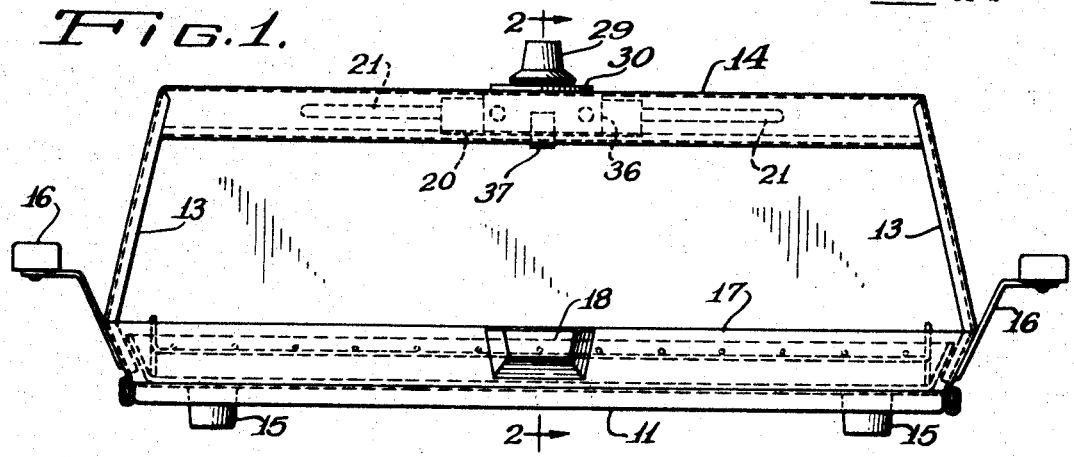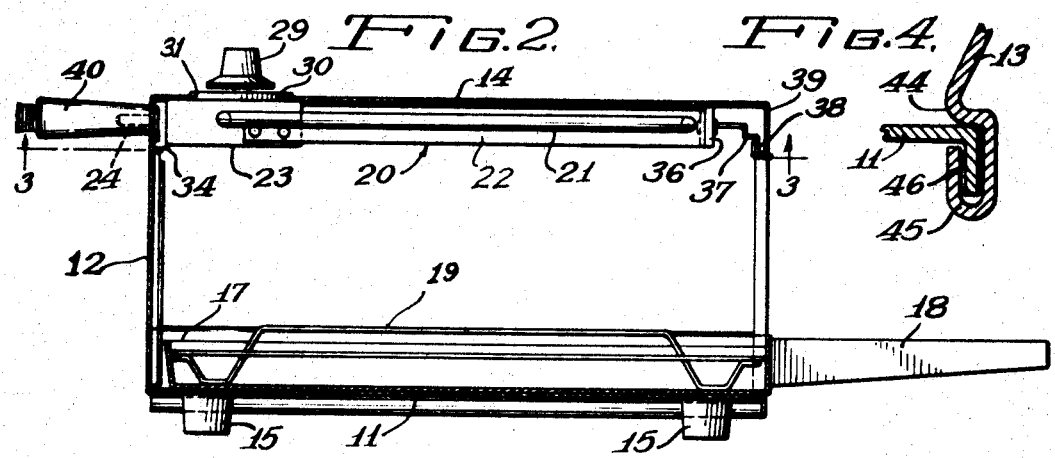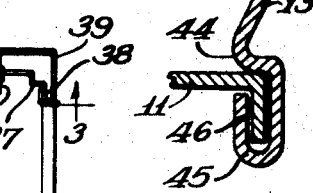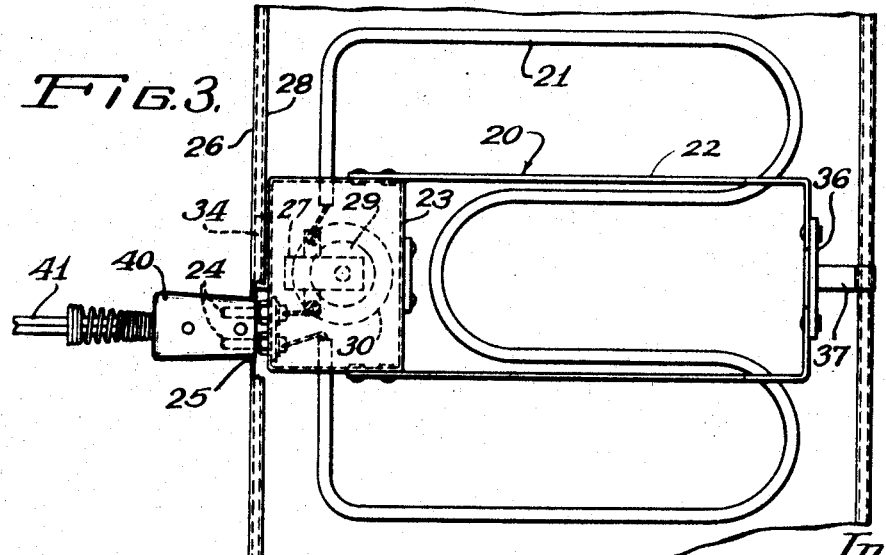

Inventor:
Robert S. Knapp
By Bair, Freeman & Molinare
Attys.

… …

United States Patent Office 3,433,930
Patented Mar. 18, 1969

3,433,930
BROILER WITH REMOVABLE
HEATING CARTRIDGE
Robert S. Knapp, St. Louis, Mo., assignor to Knapp-Monarch Company, St. Louis, Mo., a corporation of Delaware
Filed May 2, 1966, Ser. No. 547,037
U.S. Cl. 219—386
Int. Cl. F27d *11/02;* F24c *7/10*
9 Claims

ABSTRACT OF THE DISCLOSURE

A broiler chamber and heater construction that is capable of being safely separated into components, so as to simplify cleaning, is provided by two sheet metal members with interconnecting mating elements, and an electrical heating cartridge is detachably mounted on one of the sheet metal members. One member serves as a base and provides a rear wall for the heater chamber, while the other member serves as a housing to provide the side walls and the roof of the chamber. A pair of transverse apertures in said housing provides access to electrical terminal studs and to a thermostatic control that extend outwardly of the heating cartridge, and the arrangement of parts desirably requires disconnection of the electrical supply from the heating cartridge before the electrical heating cartridge may be detached from said housing member.

---

This invention relates to electrical cooking appliances and more particularly, although in its broader aspects not exclusively, to "table-top" ovens and broilers of the type used in the home.

The difficulty involved in cleaning a cooking utensile or appliance is well recognized by experienced housewives. The cleaning of a broiler or oven-type appliance is especially difficult since grease and food particles are baked on during the cooking operation.

Normally, the removal of such staunchly adhering matter is facilitated by first soaking the soiled surfaces for a period of time in soap and water. In the conventional "table-top" oven or broiler, however, total immersion of the appliance is not recomemnded because of the possibility of damaging the heating element or the associated electrical control circuitry. Although it is possible to encapsulate the heating element assembly in a waterproof casing to permit immersion, the added envelope surrounding the heating element decreases the efficiency of the heating unit and provides no real guarantee against possible damage due to leakage through cracks and the like which may develop during the life of the appliance.

It is accordingly an object of the present invention to facilitate cleaning and maintenance of an electrically heated, table-top broiler or oven-type appliance by permitting the total immersion of the soiled surfaces.

A further obstacle which is normally encountered during an attempt to clean such an appliance results from the shape of the cooking chamber itself. It is normally impossible to use an efficient scrubbing method for removing the baked-on deposits from the corners and other portions of the chamber which are accessible only with difficulty.

It is therefore, a further object of the invention to provide an appliance in which all soiled surfaces may be made more easily accessible for cleaning.

The present invention takes the form of an electrically heated broiler or oven-type appliance which is composed of a base member and a detachable housing slidably mounted thereon to form a cooking chamber. For ease of cleaning, the base member advantageously provides both the floor and the rear wall of the chamber while the detachable housing forms the two side walls and the roof of the chamber.

In accordance with a further feature of the invention, the electrical heating element assembly is detachably mounted within the chamber and a safety interlock feature prevents the removal of this assembly while the line cord is still connected to the appliance. As contemplated by the present invention, once the heating element assembly has been removed from the cooking chamber, the base member and housing may be detached from one another; whereupon, if desired, they may be individually immersed and scrubbed.

These and other objects, features and advantages of the invention may be more fully understood through a consideration of the following detailed description of a specific embodiment of the invention. In the course of this description, reference will be made to the attached drawings in which:

FIGURE 1 is a front elevational view of an electrically operated, table-top broiler which embodies the principles and features of the present invention;

FIGURE 2 is a cross-sectional view taken substantially as indicated along the line 2—2 of FIGURE 1;

FIGURE 3 is a fragmentary plan view, on an enlarged scale, taken substantially as indicated by the line 3—3 of FIGURE 2 looking upwardly at the underside of the top of the broiler and illustrating the heating elements;

FIGURE 4 is an enlarged fragmentary cross-sectional view illustrating the manner in which the housing is slidably mounted upon the base section;

Figure 5:
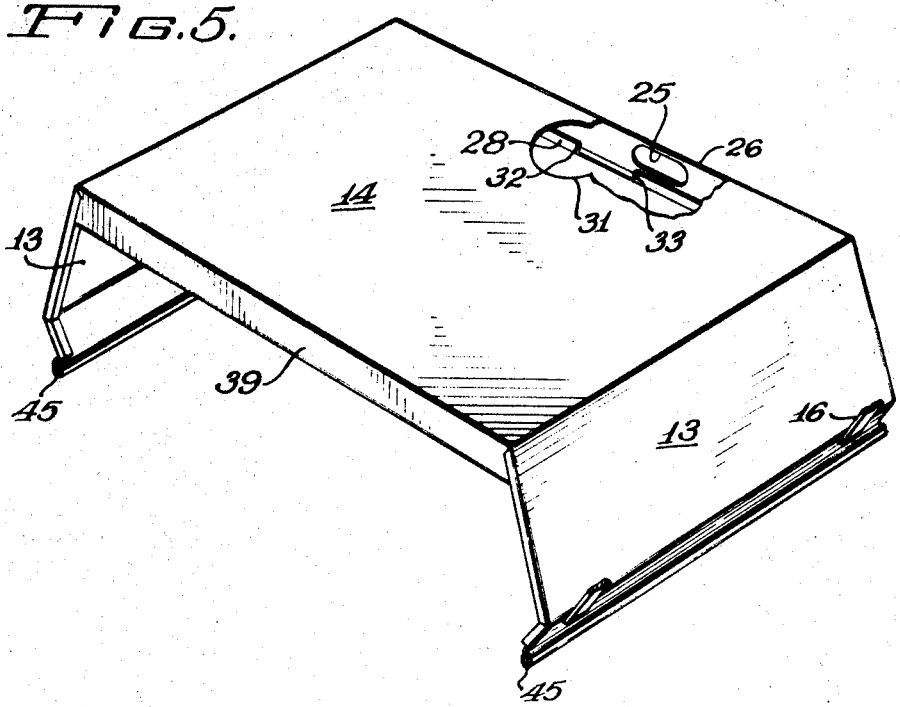
FIGURE 5 is a perspective view of the housing.

The broiler shown in FIGURES 1 and 2 includes a base section member which forms the floor 11 and the rear wall 12 of the broiler. The side walls 13 and the roof 14 of the broiler are defined as part of a housing which, as disclosed hereinafter, is slidably mounted on the base section. The general configuration of both the housing and the base section may be more readily appreciated by noting the perspective views of FIGURES 5 and 6, respectively. Four short support legs 15 are mounted on the base section and two handles 16 are laterally attached to the housing allowing the entire appliance to be moved even during cooking.

The cooking chamber defined by the housing and the base section is adapted to receive a tray 17 which, once inserted into the chamber, is supported by the floor 11. Tray 17 is equipped with a handle 18 allowing the tray to be manually removed when hot. A wire support 19 of conventional design may be fitted within the tray 17 to support the food being cooked above the bottom of the tray 17.

A heating element cartridge generally indicated at 20 is detachably mounted below and in engagement with the roof 14 of the broiler. The cartridge 20 includes a steel sheath tubular heating element 21 that is located in spaced parallel relation to the roof 14. The cartridge 20 also includes a U-shaped heating element support member 22 which is rigidly attached to a box-like casing 23 that serves to receive and enclose a thermostat 27.

As shown in FIGURE 3 of the drawings, two electrical terminal pins 24 project from the rear of the thermostat casing 23 and through an opening 25 defined in the rear downwardly depending flange 26 of the housing. The position of the oval-shaped opening 25 is shown in FIG. 5. The tubular heating element 21 is electrically connected in series with the selectively variable thermostat 27 housed in casing 23. The thermostat unit 27 is adapted to terminate current flow through the heating element 21 whenever the temperature within the cooking chamber rises above a present value determined by the setting of the control knob 29. The combination of knob 29 and a raised, cooperating temperature indicia plate 30 extends through a circular opening 31 in the roof of the housing. The position of opening 31 is shown in FIGURE 5—a portion of the roof 14 which defines the opening 31 being cut away to show inner details of the housing. The engagement of the edge of indicia plate 30 with the periphery of this opening locates the cartridge 20 precisely relative to the opening 25 in the flange 26.

The rear, downwardly depending flange 26 of the housing is shaped to also define an in-turned and upwardly extending lip 28 as shown in FIGURE 5. A section of lip 28 is cut away to form a slot defined by the edges 32 and 33. The rearward extremity of the heating element cartridge 20 is held firmly in place by the entry of a ceramic block 34 into the slot defined by edges 32 and 33. The ceramic block 34 is affixed to the casing 23 and is of a size to not only fit snugly between the edges 32 and 33 but also to fit snugly between the roof 14 and the horizontal portion of lip 28 to provide a rigid mounting.

A second ceramic block 36 is attached to the bight of support member 22 at the forward end of the heating element cartridge 20. With the cartridge 20 in proper position, the upper surface of the block 36 engages with and presses against the roof 14 of the housing to provide a firm mounting.

The forward extremity of the heating element cartridge 20 is supported by a clip 37 that is formed of spring steel and which is permanently attached at one end to the ceramic block 36. As most clearly shown in FIGURE 2 of the drawings, the unattached end of the clip 37 is appropriately shaped to permit flexing both vertically and horizontally relative to cartridge 20 and defines a downturned flange which engages with an inwardly and upwardly extending lip 38 defined on the flange 39 at the forward end of the housing.

In order to remove the heating element cartridge 20 from the housing, it is merely necessary to press inwardly and downwardly on clip 37 to disengage the clip 37 from the flange 38, thereafter manipulating the clip to cause the forward end thereof to clear flange 38, thus permitting downward pivotal movement of the heating element cartridge 20 about the fulcrum formed by the lip 28. It is important to note, however, that the plug 40 which forms the connection between the pins 24 and the cord 41 must be removed before the heating element assembly 20 may be completely separated from the housing since plug 40 is larger in cross-section than the opening 25. This automatic interlock feature is built into the removable heating element assembly arrangement as a safety feature.

In accordance with the invention, once the heating element assembly has been detached from the housing, the base and housing elements of the broiler may be separately immersed for cleaning. In addition, the tray 17, wire support 19, the base section comprising the floor 11 and the rear wall 12, and the housing comprising the sidewalls 13 and the roof 14 may each be detached from one another for ease of cleansing. As previously described, the tray 17 holding the support 19 may be immersed merely by grasping the handle 18 to remove the tray 19 and by immersing immediately by water if desired. With the heating element cartridge 20 removed, the housing as shown in perspective in FIGURE 5 may be detached from the base section shown in perspective in FIGURE 6.

The enlarged detailed drawing of FIGURE 4 illustrates the manner in which the sidewalls 13 of the housing are slidably attached in a "rail and track" configuration to the base section floor 11. The lower portion of the sidewall 13 extends downwardly and inwardly from the upper portion of a side until a point where it is bent to extend laterally outward, thereby forming a shoulder 44 which serves as an abutment for the upper surface of the floor 11 of the base section. After forming the shoulder 44, the sidewall 13 is again bent downwardly to form a U-shaped channel section 45 whose bight is spaced below the abutment shoulder 44. The inner width of the channel 45 is sufficient to slidably receive therein a rail or flange 46 extending downwardly from the floor 11. The downwardly extending flange 46 as well as the various bends at the lower extremity of the sidewalls 13 serve to respectively rigidify the floor and walls of the appliance. It may be noted that the extremity of the downwardly extending flange 46 is in spaced relation to the inner surface of the bight of channel 45 so that bearing support is affected solely by the shoulder 44 on the floor 11. The U-shaped channel 45 forms a track which maintains a smooth sliding fit with the flange 46.

Figure 6:
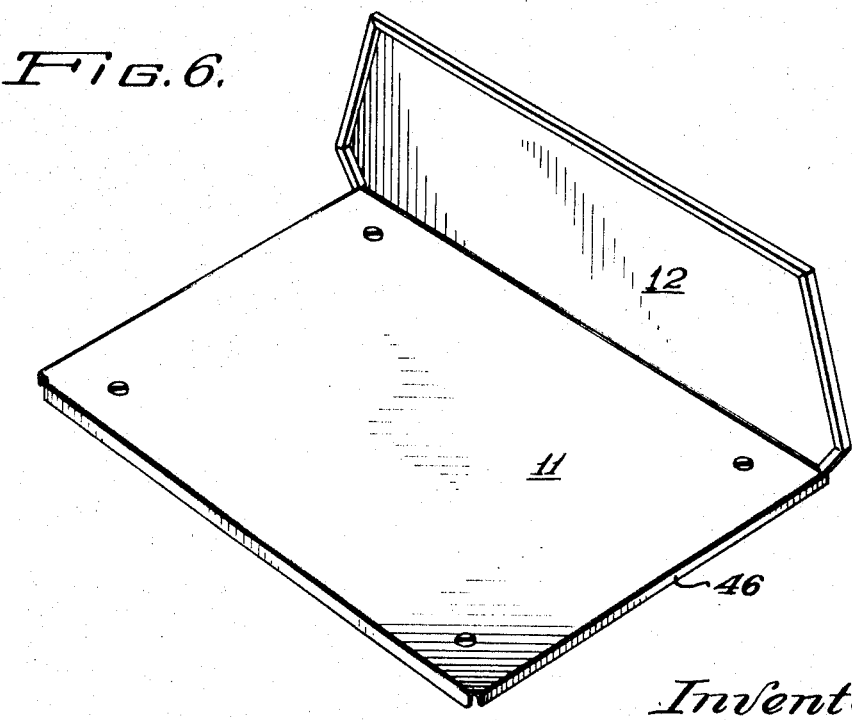
FIGURE 6 is a perspective view of the base section.

From the perspective views of FIGURES 5 and 6, it will be apparent that once the housing and base section have been detached from one another, the inside surfaces of the cooking chamber are readily accessible for cleaning and, if desired, for this purpose may be immersed and scrubbed.

It is to be understood that the embodiment of the invention which has been described is merely illustrative of an application of the principles of the invention. Numerous modifications may be made by those skilled in the art without departing from the true spirit and scope of the invention.

What is claimed is:

1. A broiler chamber and heater construction that may be readily and safely separated into components to simplify cleaning and maintenance of the inner surfaces of said chamber which comprises, in combination, a base member formed to include at least a portion of the bottom of said chamber and a rear wall for said chamber, a housing member formed to provide side walls and the roof of said chamber, said housing member being connected to said base member by means of interconnecting mating elements carried on said base member and said housing, said housing and said base members when assembled forming said cooking chamber, and an electrical heating cartridge detachably mounted within said chamber.

2. A construction as set forth in claim 1 including electrical terminal studs affixed to said cartridge and extending outwardly of said chamber and through a portion of one of said members defining said chamber, a power supply cord and plug for electrically energizing said cartridge through said studs, and means for preventing detachment of said cartridge from said appliance until said cord and plug is first electrically separated from said studs.

3. The combination set forth in claim 1 wherein the housing member is constructed of sheet metal and is shaped to define spaced horizontal and vertical wall elements thereon adapted for cooperation with said cartridge to effect a rigid mounting, a first aperture in said housing member adapted to have said studs extend therethrough, a thermostat control means for said cartridge, and a second aperture in said housing member adapted to have said control means extend therethrough.

4. The combination set forth in claim 1 wherein said electrical heating cartridge comprises a frame, a heating element carried by said frame, a thermostat control for said heating element, and spaced ceramic elements on said frame providing for engagement with one of said members to insulate said frame, heating element and thermostat control from said one member.

5. A combination as set forth in claim 4 wherein one of the said ceramic elements carries a spring steel clip adapted for manual detachable engagement with said one member.

6. A combination as set forth in claim 2 wherein said means for preventing detachment of said electrical cartridge from said appliance comprises, in combination, an aperture in said one member which is sufficiently large to permit the connection of said cord and plug to said terminal studs but which is sufficiently small to prevent the passage therethrough of both said cartridge and said cord and plug.

7. A combination as set forth in claim 1 wherein said interconnecting mating elements on said base member and said housing member are elongated rail and track means for effecting a sliding connection between said base member and said housing member.

8. In a broiler chamber and heater construction that may be readily and safely separated into multiple chamber-defining elements each separate from the heating means so that said multiple elements each may be cleaned by full immersion in a cleaning bath, the improvement comprising, in combination:

one of the elements having two apertures defined therein which open in directions transverse to each other;
an electrical heating cartridge detachably mounted on said one element and having extending therefrom electrical terminal studs which project outwardly of a first of said two apertures and a thermostat control which projects outwardly of the other of the two apertures; and the size of the said first aperture being such as to prevent passage therethrough of an energizing plug which is to attach to the terminal studs, so as to require separation of the energizing plug from the terminal studs before the cartridge may be separated from the broiler.

9. A device as in claim 8 wherein the electrical heating cartridge includes a sinuous heating element, a frame separate from the heating element carrying the heating element and having insulating means thereon for engaging a wall of the chamber for rigidly mounting the heating element and for locating the heating element spaced from both electrical and heat-conducting contact with all walls of the chamber.

References Cited
UNITED STATES PATENTS

| | | | |
|---|---|---|---|
| 3,243,576 | 3/1966 | Lee et al. | 219—386 |
| 3,304,407 | 2/1967 | Clark et al. | 219—435 |

BERNARD A. GILHEANY, *Primary Examiner.*

ROY N. ENVALL, JR., *Assistant Examiner.*

U.S. Cl. X.R.

219—435, 436, 442